G. JONES.
Assignor, by mesne assignments, to E. SARLES.
Door-Knob.
No. 8,743. Reissued June 10, 1879.
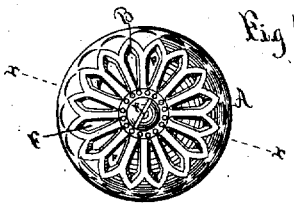
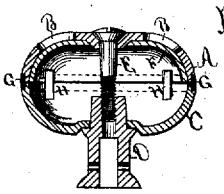
Witnesses.
W. B. Thomson.
P. J. Martlay
Inventor,
George Jones.
By James Shepard Atty
N. PETERS, PHOTO-LITHOGRAPHER, WASHINGTON, D. C.

UNITED STATES PATENT OFFICE.

GEORGE JONES, OF PEEKSKILL, NEW YORK, ASSIGNOR, BY MESNE ASSIGNMENTS, TO EMMETT SARLES.

IMPROVEMENT IN DOOR-KNOBS.

Specification forming part of Letters Patent No. 103,749, dated May 31, 1870; Reissue No. 8,743, dated June 10, 1879; application filed May 7, 1879.

*To all whom it may concern:*

Be it known that I, GEORGE JONES, of Peekskill, in the county of Westchester and State of New York, have invented a new and useful Improvement in Door-Knobs; and I do hereby declare that the following is a full, clear, and exact description thereof, which will enable others skilled in the art to make and use the same, reference being had to the accompanying drawings, forming part of this specification.

The invention relates to a new and useful improvement in knobs for doors; and consists of the knob proper, composed of two sections, having a lip on one part taking into a recess in the other part; also, of said parts having a metal band at the adjoining edges of said section; also, of two hollow sections and the knob-shank bound together by a central screw; also, a knob composed of two sections, shank, and band, secured to turn together like a solid knob; also, of a knob the outer section of which is open-work, backed by an interior ornamental plate; and, also, of a knob formed of sections, each having an annular recess, into which is fitted a metal band, all as hereinafter described.

In the accompanying drawings, Figure 1 represents the end or outer portion of the knob. Fig. 2 is a cross-section of Fig. 1 on the line *x x*.

The knob proper of this knob is made in two parts, the same being attached to the neck of the shank by a central screw, which spans the inner section or portion of the knob and takes into the outer section and neck of the shank.

A designates the outer hemisphere or section of the knob. This is made of cast metal, with apertures B, of any desired design, as shown in Fig. 1. The inner portion or section, C, of the knob has a central and angular orifice, through which the neck of the shank D of the knob passes, the neck being of angular shape, corresponding to the orifice in section C. A central screw, E, taking into the shank D at one end and the section A at the other end, secures said parts together.

Corresponding with the form of the inner surface of the section A there is an ornamental plate, F, of any suitable material, the outer surface of which may be polished, plated, or colored, so that when seen through the apertures B the knob will present an ornamental appearance.

The sections A C have each an annular recess at their adjoining edges, in which recesses is a metallic band, G, as seen in Fig. 2, said band surrounding and covering the adjoining edges of the sections A C. This band may be plated, polished, or colored in any manner, and its outer surface may be milled, serrated, or fluted, if desired.

The sections A C are secured against independent rotation by means of the lips H on one part taking into recesses on the other part, whereby, with a snugly-fitting band and the angular neck of the shank set in an angular recess, the parts are secured so as to turn together practically the same as a solid knob.

I am aware that a solid knob having an angular recess, into which was fitted an angular neck of a knob-shank, has been secured to said shank by means of a central screw, and I hereby disclaim the same.

I am also aware that picture-nails have been made in which the detachable head was made in two parts, secured together by a metal band at their adjoining edges, but which heads were not secured to the shank, so as to rotate therewith, and I hereby disclaim said picture-nails.

I claim as my invention—

1. In a knob, the knob proper, composed of two sections, having a lip on one part taking into a recess on the other part, to insure simultaneous rotation of both sections, substantially as described, and for the purpose specified.

2. In a knob, the knob proper, composed of two sections, having lips on one part taking into recesses on the other part, and a metal band surrounding the adjoining edges of said sections, substantially as described, and for the purpose specified.

3. A hollow knob composed of two hollow sections, forming substantially two halves of the knob proper, and the shank fitted into one of said sections, the said three pieces being bound together by means of a central screw, substantially as described, and for the purpose specified.

4. A knob composed of sections, forming substantially the two halves of the knob proper, a metal band surrounding the adjoining edges of said sections, and the knob-shank, the whole secured so as to turn together practically the same as a solid knob, substantially as described, and for the purpose specified.

5. A knob having a series of apertures in the outer casing, combined with an ornamental plate of corresponding shape within said outer casing, substantially as described, and for the purpose specified.

6. In a knob, the knob proper, composed of two sections, each having an annular recess at its adjoining edges and a metal band fitting said recesses, substantially as described, and for the purpose specified.

GEORGE JONES.

Witnesses:
JOHN OMBONY, Jr.,
JOHN C. KNAPP.